United States Patent [19]

Wolfe et al.

[11] 4,106,359

[45] Aug. 15, 1978

[54] ANTIFRICTION ASSEMBLIES

[75] Inventors: Denis G. Wolfe, Santa Ana; Richard J. Berryhill, Fullerton, both of Calif.

[73] Assignee: Robertshaw Controls Company, Richmond, Va.

[21] Appl. No.: 606,484

[22] Filed: Aug. 21, 1975

[51] Int. Cl.$^2$ ............................................. F16H 1/18
[52] U.S. Cl. ................. 74/424.8 R; 74/89.15; 308/238
[58] Field of Search ........ 74/89.15, 424.8 R, 424.8 B; 308/237, 238, 239

[56] References Cited

U.S. PATENT DOCUMENTS

| | | | |
|---|---|---|---|
| 2,717,792 | 9/1955 | Pelley | 308/238 |
| 3,203,304 | 8/1965 | Rapata | 308/238 |
| 3,416,386 | 12/1968 | Pickles | 74/424.8 R |
| 3,533,298 | 10/1970 | Gerber | 74/89.15 |
| 3,561,033 | 2/1971 | Trenary et al. | 74/89.15 |
| 3,730,016 | 5/1973 | Miller | 74/424.8 B |

Primary Examiner—Benjamin W. Wyche
Assistant Examiner—Wesley S. Ratliff, Jr.
Attorney, Agent, or Firm—Fulwider, Patton, Rieber, Lee & Utecht

[57] ABSTRACT

There is disclosed an antifriction assembly of relative moving machine elements such as shaft and thrust bearing or screw and nut assemblies having engagement surfaces formed of materials characterized by a coefficient of friction which is inversely dependent upon compressive loading. Typical of such materials are plastics such as fluorocarbons, polyamides and/or acetal resins. The antifriction assembly utilizes the aforementioned characteristics of these materials to achieve minimal force and wear and maximum life. The shaft and thrust bearing assembly comprises a shaft having a grooved land to receive a bearing plate which has a slotted aperture to capture the shaft. The shaft and bearing are formed of the aforementioned plastics. The screw and nut assembly comprises members that are also formed of the aforementioned plastics. The screw member has external helical threads and the annular nut member has internal helical threads of the same or substantially the same pitch as the external threads and is threadably engaged on the screw member. The external and internal helical threads have distinctly different flank angles to provide a minimal length of thread engagement and a maximum of surface loading. In the preferred embodiment the thread engagement comprises a line spiral contact between the members and is obtained by providing substantially square threads on one of the members and threads with an acute flank angle on the other member.

18 Claims, 8 Drawing Figures

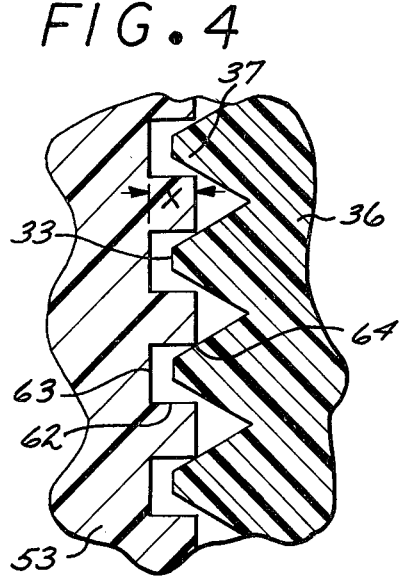
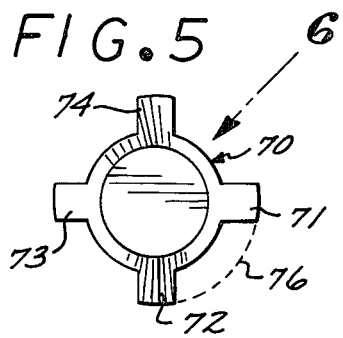
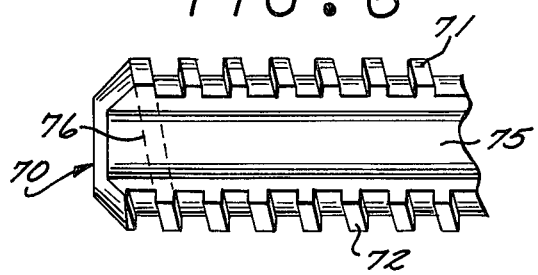
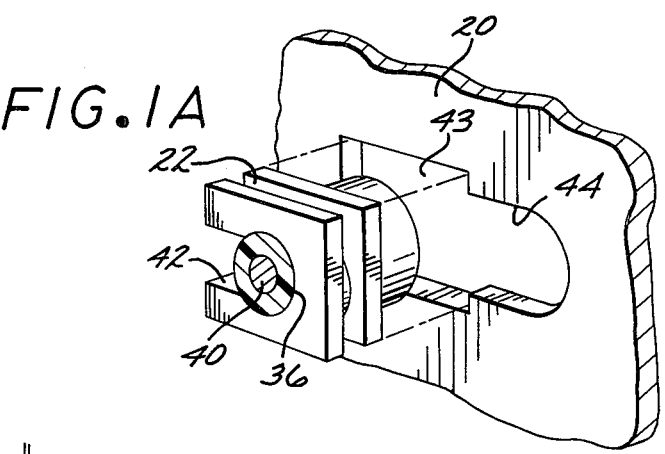
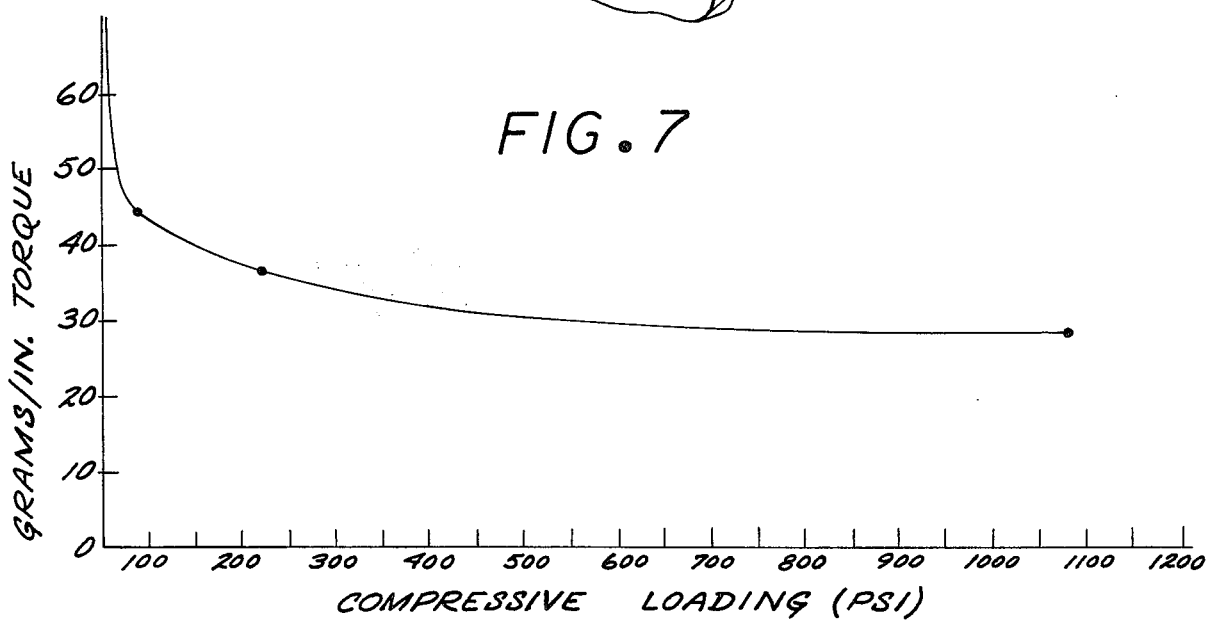

ANTIFRICTION ASSEMBLIES

BACKGROUND OF THE INVENTION

1. Field of the Invention

This invention relates to antifriction assemblies and, in particular, to antifriction assemblies of shaft and bearing, or of screw and nut members of particular construction and design.

2. Brief Statement of the Prior Art

Various designs have been employed for antifriction threaded members such as an assembly of a screw and nut. Typical of these are the members having peripheral roller elements in the nut member such as that described in U.S. Pat. No. 3,406,584 or 3,648,535. The construction of these members is relatively complex, requiring a nut member housing which rotatably supports a plurality of peripherally disposed roller members having helical external threads to function as planet elements about the central, threaded screw shaft. The complexity of design of these assemblies results in a high initial cost and maintenance requirement. Accordingly, this design is not ideally suited for use in remote installations or in equipment where high initial cost is to be avoided. Typical of such installations is the damper actuator for controlling the position of dampers of conventional heating and cooling installations. Commonly these are actuated by a motor that drives a rotatable member such as a threaded shaft on which is carried a traveling nut member which is mechanically connected to the damper, thus serving as a transducer of rotary to reciprocal motion.

Attempts to substitute the metallic elements of conventional threaded assemblies with plastics have generally been unsuccessful. The direct substitution of plastics for metals in the construction of screw and nut members results in assemblies which exhibit excessive wear and frequent failure. Attempts to obviate this behavior and extend the life of the plastics elements have generally been pursued along the design parameters of metallic threaded members, typically directed toward reducing the specific loading on the members by increasing the bearing surface areas. This practice has been followed despite the knowledge that some plastics such as the fluorocarbons, polyamides and acetal resins, among others, have coefficients of friction which are inversely proportional to compressive loading on bearing surfaces of such plastics.

BRIEF STATEMENT OF THE INVENTION

This invention comprises a thrust bearing design of simple construction and assembly which includes a shaft such as a lead screw which has a land groove to receive a thrust bearing plate which has a slotted aperture to capture the shaft groove. The invention also comprises a design for threaded members such as a lead screw and nut which minimizes the area of thread engagement between the threaded members and impart maximum compressive loading thereto. In both of the thrust bearing and thread designs, the individual members are formed with bearing surfaces substantially or totally of plastics having a coefficient of friction which is inversely proportional to the compressive loading on the surfaces. The preferred thread design comprises an assembly of mating screw and annular nut members bearing, respectively, external and internal, helical threads of the same or substantially the same pitch but having distinctly different flank angles to provide a minimal length of thread engagement. Ideally, the area of thread engagement comprises a line spiral contact between the members such as that achieved by mating square threads of one member with threads having an acute flank angle on the opposite member. The plastics of preference for the thread bearing surfaces are fluorocarbons, polyamides, and/or acetal resins or mixtures thereof. The aforementioned thread design is uniquely of benefit when the members are constructed of the aforementioned plastics; if constructed of metals, the thread design unavoidably results in galling of the bearing surfaces, producing excessive wear and premature failure. When employed with the members formed of plastics having the aforementioned coefficient of friction that is inversely proportional to compressive loading, exactly the opposite results are obtained and minimal wear and maximum life is achieved.

BRIEF DESCRIPTION OF THE DRAWINGS

The invention will be described with reference to the figures of which:

FIG. 4 illustrates engaged threaded members of the invention;

FIGS. 5 and 6 illustrate an alternative design for a screw member of the invention; and FIG. 7 illustrates typical work and loading characteristics of members formed of plastics having an inversely related coefficient of friction and compressive loading.

DESCRIPTION OF PREFERRED EMBODIMENTS

Figure 1:
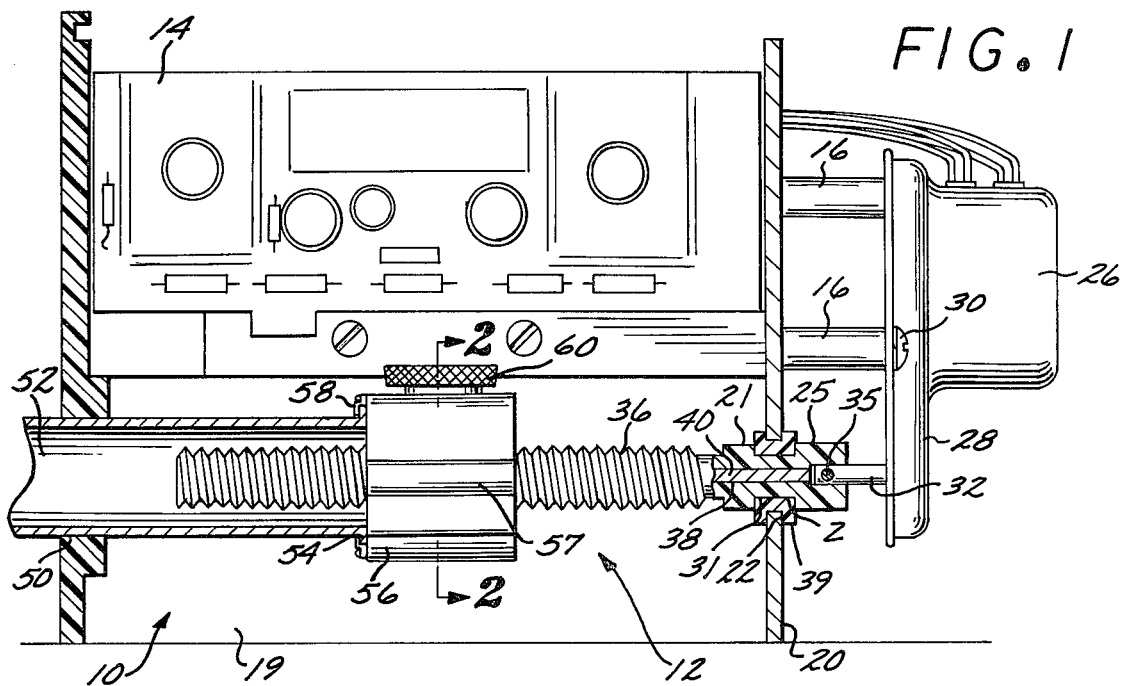
FIGS. 1–3 illustrate a typical application of the invention.
Figure 2:
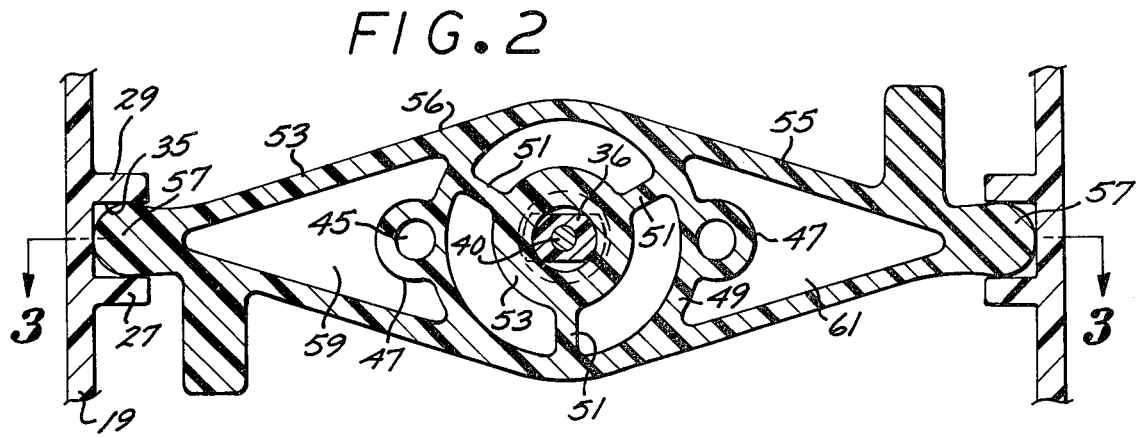
Figure 3:
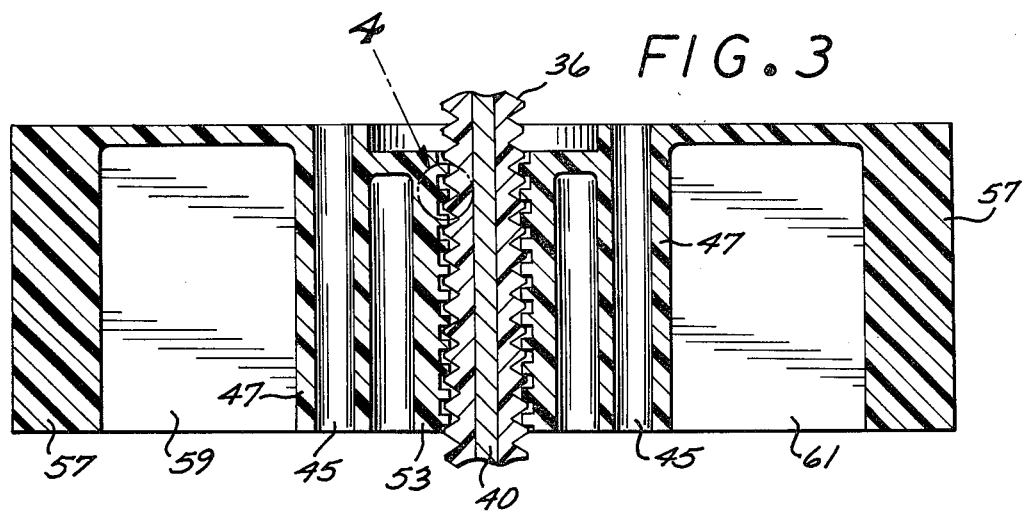

Referring now to FIGS. 1–3, the invention is illustrated as incorporated in a damper actuation control unit generally indicated at 10, which includes a mechanical transducer for converting rotary to reciprocal motion that is generally identified at 12. These components and an associated electronic circuit board 14 are carried within a housing 18 which is shown as a box having an upper open end which receives a cover plate, not shown. One wall, 20 of the housing bears a motor drive unit 24 formed of a reversible electrical motor 26 with an appropriate gear reduction unit 28. The drive unit is secured on the exterior wall of the housing with machine bolts, screws, rivets or the like, 30 which extend through housings 16. The output shaft of the gear reduction unit 32 is in driving interconnection to lead screw 36 by suitable means such as roll pin 35. Lead screw 36 is rotatably carried by thrust bearing means 39 mounted in a bore in the wall 20 of the housing. The lead screw 36 has a grooved land 19 to receive the thrust bearing means 39 between annular shoulders 21 and 25.

Thrust bearing means 39 comprises a single plate member bearing an approximate cylindrical bore 41 with grooves 22 on the outside surface perpendicular to axis of lead screw 36 into which plate 20 is fitted. Bearing means 39 supports axial thrust loads applied to screw 36 in either direction. The thrust bearing means 39 is shown in greater detail in FIG. 1a which illustrates the bearing means 39 and supporting wall 20 in partial disassembly. The bearing bore 41 is intersected by an axial slot 42 which is slightly less than the cylindrical diameter of lead screw 36 to allow bearing means 39 to be spread apart and installed over lead screw 36 in a semi-captive fashion. Plate 20 has an aperture 43 to receive bearing means 39 and a dependant slot 44 which receives grooves 22, permitting the bearing means 39 to be moved into a centering position for lead screw 36. In this manner, a single thrust bearing means 39 provides the thrust bearing support for axial loads applied to lead screw 36 in either direction. One and, preferably both, of lead screw 36 and thrust bearing means 39 are formed of plastics having a coefficient of friction which is inversely proportional to compressive loading. In the preferred embodiment, the lead screw 36 is formed of Nylon and the thrust bearing 39 is formed of Delrin AF, described in greater detail hereinafter.

The lead screw is bored at 38 to receive metal insert 40 which extends the greater portion of the length of lead screw 36 for strengthening purposes. Metal insert 40 may be mechanically locked to lead screw 36 by imparting a surface roughness to insert 40 and bonding screw 36 to insert 40 either during molding, using ultrasonic methods, chemical glues or epoxies, or similar methods to achieve a direct mechanical bond.

The opposite wall 23 of housing 18 has an aperture 50 in axial alignment with lead screw 36 and tubular member 52 projects through aperture 50 in generally coaxial alignment with lead screw 36. The inboard end of tubular member 52 bears peripheral flange 54 which is seated against a face of traveling nut member 56. A ring retainer member 58 is secured to traveling nut member 56 and engages peripheral flange 54 whereby the tubular member 52 is axially secured to traveling nut member 56 but is free for rotation thereon.

The outboard end of tubular member 52 bears work attachment means for securing to a damper of a conventional heating or cooling system. The traveling nut member also bears a wiper arm 60 that contacts a linear potentiometer which is in the electronic circuit board 14 in a feed-back circuit to register the position of the damper to the control circuit of the actuator motor 26.

FIG. 2 is a cross section elevation view through the traveling nut member which can be seen to have two radially extending side flanges 55 bearing bulbous edges 57 which are in sliding engagement with tracks 35 that are formed on the inside surfaces of the sidewall such as 19 of the housing 18.

As illustrated in FIG. 2, sidewall 19 bears longitudinal internal ribs 27 and 29 which are closely spaced, parallel ribs defining interior track 35 which slidably receives bulbous end 57 of the traveling nut member, thereby securing this member against rotation.

The traveling nut member 56 is, preferably, molded of a suitable thermoplastic and is of hollow form construction having longitudinal cavities 59 and 61 about a central annular nut member 53 which is carried on axial ribs 51 that project to an integrally formed sleeve 49. The sleeve 49 bears longitudinal ribs 47 which are bored at 45 to receive fasteners such as rivets which extend through retainer 58 and secure the retainer member to the traveling nut member 56.

As illustrated in FIG. 3, the invention is applied to the aforedescribed structure by utilizing threaded members such as lead screw 36 and traveling nut member 56, as well as the aforementioned bearing 39, with bearing surfaces that are formed substantially or totally of plastics having a coefficient of friction which is inversely proportional to the compressive loading on the surfaces. This is achieved in the illustrated embodiment by forming the thrust bearing 39, annular nut member 53 and lead screw 36 of the plastics having the aforementioned characteristic coefficient of friction.

A wide variety of plastics is available for selection of a suitable material or combination of materials for use in the invention. Among the materials that can be used and that exhibit the aforementioned inverse relationship of coefficient friction and compressive loading to a desirable extent are: fluoroplastics which are paraffinic hydrocarbon polymers in which all or part of the hydrogen atoms have been replaced with a fluorine atom. Another halogen, chlorine, can also be present, replacing a portion of the hydrogen atoms of the polymer. In order of decreasing chlorine substitution, the use of polymers include the following which are commercially available under the TEFLON mark: polytetrafluoroethylene (TFE); fluorinated ethylene propylene (FEP); chlorotrifluoroethylenes (CTFE) and polyvinylidine fluoride ($PVF_2$). The TFE polymer is a homopolymer, containing TFE monomer units exclusively. The FEP is a copolymer, having a fraction of hexafluoropropylene units inserted in a chain formed of tetrafluoroethylene units. The CTFE resins differ from the TFE resins in that one or more of the fluorine atoms of the later are replaced with a chlorine atom. $PVF_2$ is a high molecular weight homopolymer of vinylidene fluoride having greater mechanical strength and a lower cold flow characteristic than most of the other fluoroplastics.

Other suitable resins which are useful for forming one or both of the threaded members employed in the invention are polyamides which are essentially linear polymer chains of amide groups separated by from 4 to 11 methylene groups. These polymers are made by condensing diamines with dibasic acids or by polymerization of amino acids to form long polyamide chains. These polymers are commercially available under the trade designation NYLON available in different numerical classifications which reflect the different chemical composition and properties of the material. The five major homopolymers which are available are Nylon 6, 6/6, 6/10, 11 and 12. Nylon 6 is essentially polycaprolactan; Nylon 6/6 is obtained by the condensation polymerization of hexamethylene diamine and sebacic acid; Nylon 11 is produced from 11-aminoundecanoic acid; and Nylon 12 is produced from 12-aminododecanoic acid.

Other suitable plastics having inverse relationship of coefficients of friction and compressive loading are the acetal resins which are available as homopolymers under the designation DELRIN. These resins are prepared by polymerization of formaldehyde and are available in numerical designations of 100, 500 and 900 for injection molding and 150 and 550 for extrusion molding. The numerical categories designate homopolymers of different melt viscosity from the most viscous (100) to the most fluid (900). These resins are also available in mixtures, e.g., Delrin AF, is a commercially available mixture of an acetal homopolymer which contains 20 weight percent of TFE fluorocarbon resin fibers. Another useful product is Delrin 570X which is an acetal homopolymer containing a comparable amount of glass fibers.

Referring now to FIG. 4, the thread design of the invention will be described. As there illustrated, the lead screw member 36 is provided with external helical threads 37 which are generally conventional in construction having a crest 33 and root 35 interconnected by flank 39 at a flank angle, commonly known as half angle of thread, of approximately 60°. The annular nut member 53 bears internal threads 60 which have a distinctly different flank angle from that of the external threads on lead screw 36.

The threads 60 on the annular nut member 53 have, of course, the same pitch as the threads 37 on lead screw 36 so that the threads of these members can engage in the illustrated manner. The depth of the thread engagement, generally indicated at X can be varied as desired in the design. The surface area of the thread engagement between the two mating threads is maintained at a minimal value. In the illustrated embodiment the area of thread engagement is essentially a line contact between the sharp corners such as 64 of the square and the mating point on the flank 39 of the lead screw thread 37. The total engagement between these members thus comprises a line spiral contact extending along the engaged sharp edges of the square threads on nut member 53.

The illustrated embodiment, therefore, insures the maximum compressive loading on the plastic members and thereby insures a minimal coefficient of friction between these members. It is, of course, apparent that modification of the illustrated embodiment could be utilized while, nevertheless, securing the benefits of the invention. Thus, any distinct difference between the flank angles of the threads of the mating members, e.g., any differences of from greater than about 2°, preferably greater than about 5°, would likewise achieve substantially increased loadings of the bearing surfaces and thereby secure substantial reductions in coefficients in friction of these members. The differences in angle of the threaded members can, conveniently, be expressed as the included angle between their mating thread surfaces.

Other embodiments can be used to secure comparable increases in loading on the bearing surfaces of the engaged threaded members with corresponding reduction in coefficients of friction thereof. FIGS. 5 and 6 illustrate a typical embodiment in which the continuous helical threads of a screw member 70 are interrupted to provide a series of axially aligned lugs 71–74 which are positioned along the shank 75 of member 70 in a regular progression at the preselected pitch of the member. In the illustrated embodiment, a substantial portion of the spiral line contact described in regard to FIG. 4 has been eliminated; one fourth of the eliminated portion is generally indicated as broken line 76 in FIGS. 5 and 6. The screw member 70 illustrated in FIGS. 5 and 6 could be readily formed by conventional machining of a square thread on a tubular shank 75 followed by milling axially along the body to remove the undesired portions.

FIG. 7 illustrates the inverse relationship of the coefficient of friction with compressive loading of plastic materials. The data depicted in FIG. 7 were obtained in a test wherein a shaft was supported in a vertical position on a bushing which served as a thrust bearing under investigation. The vertical shaft carried a table on which varied weights were placed to provide controlled and varied loadings on the test bushing. The upper end of the vertical rod was loosely supported in a Nylon bearing to maintain it in the vertical position. In the test, three bushings having annular bearing areas of: (a) 0.0037 square inches; (b) 0.018 square inches; and (c) 0.046 square inches were successively employed. Weights were placed on the table and the aforedescribed bushings were tested in experiments in which the torque in gram inches for rotating the table at a constant rotational velocity was measured.

The results are graphically depicted in FIG. 7, in which a representative curve is shown for the torques obtained for three bearing designs at the same 4-pound load. The curve shows that the measured torque decreased with increasing compressive loading of the bushings; the bearing requiring the minimum torque had the greatest compressive loading of 1,080 psi. while the bearing of the least compressive loading of 87 psi. required the greatest torque. In every instance, the total torque required for rotation significantly decreased with increased compressive loading on the bearing surfaces.

The invention has been described with reference to the illustrated and presently preferred embodiments thereof. It is not intended that the invention be unduly limited to the illustrated and presently preferred embodiments. Instead, it is intended that the invention be defined by the means and there obvious equivalents set forth in the following claims.

What is claimed is:

1. An antifriction assembly comprising:
   (a) an elongated screw member having external helical threads;
   (b) an annular nut member having internal helical threads of the same pitch and diameter as said external helical threads and threadably engaged on said screw member; and
   (c) said external and internal helical threads having distinctively different flank angles to provide a minimal surface area of thread engagement and maximum surface loading;
   said members being formed with engagement surfaces of plastics characterized by a coefficient of friction that is inversely dependent upon compressive loading.

2. The assembly of claim 1 wherein said members have an engagement surface comprising a line spiral contact.

3. The assembly of claim 2 wherein said plastics is selected from the class of fluorocarbon, polyamide and acetal resins and mixtures thereof.

4. The assembly of claim 3 wherein the bearing surfaces of one of said members is formed of an acetal resin and the bearing surface of the other of said members is formed of a polyamide.

5. The assembly of claim 4 wherein said first of said members is formed of a mixture of acetal and fluorocarbon resins.

6. The assembly of claim 3 wherein said plastics is a fluorocarbon.

7. The assembly of claim 1 wherein one of said members has substantially square helical threads having a flank angle of 0° and the other of said members has threads with an acute flank angle.

8. The assembly of claim 1 wherein said external and internal helical threads have an included angle of at least about 2°.

9. The assembly of claim 1 wherein said external and internal helical threads have an included angle of at least about 5°.

10. An antifriction assembly comprising:
    (a) a shaft member bearing a land groove; and
    (b) a thrust bearing member having an aperture for receiving the land groove of said shaft member and slotted from one edge thereof to permit said shaft member to be placed into and captured within said aperture;

said members being formed with engagement surfaces of plastics characterized by a coefficient of friction that is inversely dependent upon compressive loading.

11. The assembly of claim 10 wherein said thrust bearing member has grooved opposite edges and is received in a slot of a support plate.

12. The assembly of claim 11 wherein said shaft is the extension of an elongated screw member bearing external helical threads.

13. The assembly of claim 12 wherein said screw member bears an annular nut member having internal helical threads of the same pitch and diameter as said external threads and of different flask angles to provide a minimum surface area of thread engagement and maximum surface loading.

14. The assembly of claim 13 wherein said screw and nut members are formed with thread engagement surfaces of plastics characterized by a coefficient of friction that is inversely dependent upon compressive loading.

15. The assembly of claim 10 wherein said plastics is selected from the class of fluorocarbon, polyamide and acetal resins and mixtures thereof.

16. The assembly of claim 15 wherein the bearing surfaces of one of said members is formed of an acetal resin and the bearing surface of the other of said members is formed of a polyamide.

17. The assembly of claim 10 wherein said plastics is selected from the class of fluorocarbon, polyamide and acetal resins and mixtures thereof.

18. The assembly of claim 17 wherein the bearing surfaces of one of said members is formed of an acetal resin and the bearing surface of the other of said members is formed of a polyamide.

* * * * *

UNITED STATES PATENT OFFICE
CERTIFICATE OF CORRECTION

Patent No. 4,106,359　　　　　　　　　　Dated August 15, 1978

Inventor(s) Denis G. Wolfe et al

It is certified that error appears in the above-identified patent and that said Letters Patent are hereby corrected as shown below:

Claim 1, line 5, delete --and diameter--.

Claim 13, line 3, delete --and diameter--.

Signed and Sealed this

*Twentieth* Day of *March 1979*

[SEAL]

*Attest:*

RUTH C. MASON
*Attesting Officer*

DONALD W. BANNER
*Commissioner of Patents and Trademarks*